Jan. 2, 1962     E. W. KJELLMARK, JR     3,015,651
INCREASING VISCOSITY OF POLYCAPROLACTAM BY
REMOVING EXTRACTABLES WITH SOLVENTS AND
FURTHER SOLID PHASE POLYMERIZING
THE POLYMER
Filed Sept. 28, 1956
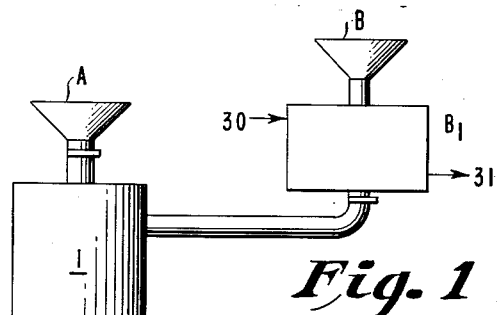
*Fig. 1*
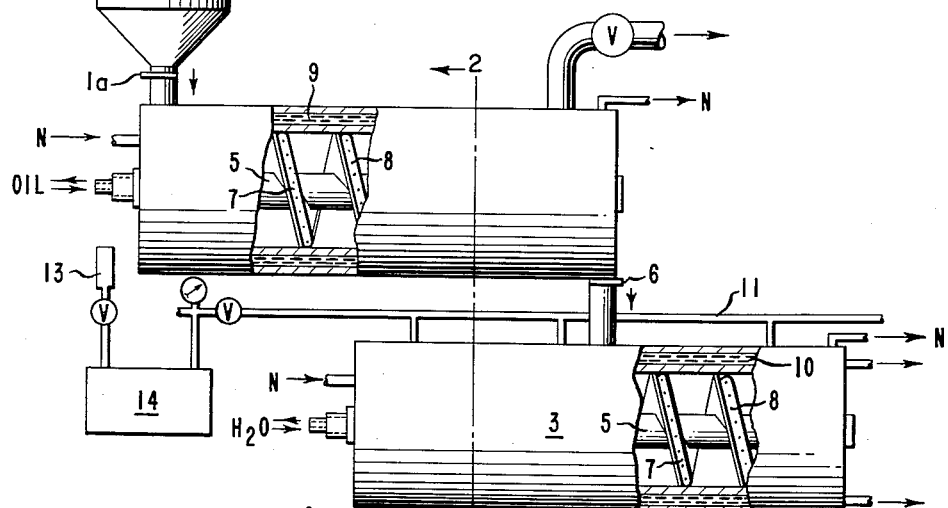
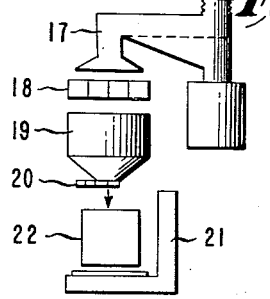
*Fig. 2*
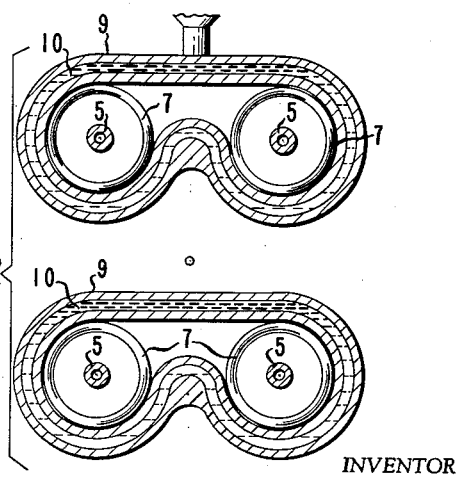
INVENTOR
ERIC W. KJELLMARK, JR.
BY
ATTORNEY United States Patent Office 3,015,651
Patented Jan. 2, 1962

3,015,651
INCREASING VISCOSITY OF POLYCAPROLACTAM BY REMOVING EXTRACTABLES WITH SOLVENTS AND FURTHER SOLID PHASE POLYMERIZING THE POLYMER
Eric William Kjellmark, Jr., Wilmington, Del., assignor to E. I. du Pont de Nemours and Company, Wilmington, Del., a corporation of Delaware
Filed Sept. 28, 1956, Ser. No. 612,838
3 Claims. (Cl. 260—78)

This invention relates to a process of producing high molecular weight, high strength synthetic linear polyamides and more partcularly to a process for upgrading, by solid phase polymerization, prepolymerizates of the amino acids.

Many commercial products are made today from compositions known generally as the synthetic linear polyamides. The products are made by various methods such as spinning, extruding, casting, blow molding, compression molding and the like. For these and related methods, polyamides obtained from dibasic acids and diamines by the processes of the U.S. Patents 2,071,250-1-3 are used, as well as those obtained, for example, from lactams of the amino acids by the melt polymerization process of the U.S. Patents 2,241,321-2-3. The invention is concerned with increasing the molecular weight and strength of the polymers produced by the process of the latter patents, and especially is concerned with upgrading such polymers that contain volatile reaction by-products.

An object of the present invention is to provide a process for treating synthetic linear polyamides of relatively low viscosity to give high strength polymers. Another object is to provide a process for increasing the molecular weight of amino acid polymers by a solid phase polymerization process. Yet another object is to prepare high strength, high molecular weight polymers from the aforesaid and like polymers after a conditioning treatment of the polymers of a lower strength and lower molecular weight. Still another object is to provide superior high strength plastic compositions. Other objects and advantages of the invention will hereinafter appear.

In its broader aspects the invention constitutes a process of increasing the inherent viscosity and molecular weight of the synthetic linear polyamides that contain at least 2% by weight of extractable materials. These materials are water of the condensation reaction as well as soluble monomeric and polymeric products present after polymerization. These extractables are removed or the amount present reduced to no more than 1.5% by solvent extraction and, thereafter, the aforesaid properties of the polymer are upgraded by solid phase polymerization. The invention, in a more limited aspect, constitutes a means of improving the rate at which solid phase polymerization of such polymers can be carried out.

The invention will be more readily understood by reference to the drawings in which like parts are designated by like numbers throughout. FIGURE I illustrates diagrammatically and in partial cutaway portions, apparatus in which the process of the invention is conducted, and FIGURE II illustrates a cross-section at 2—2 and 3—3 of FIGURE I.

The apparatus illustrated in FIGURE I comprises essentially a hold-up tank 1, with alternate charging means A and B, polymerization vessel 2, cooling vessel 3, canning hopper 4 and auxiliary canning equipment, screen feeder 17, magnetic filter 18, hopper 19, discharge gate 20, canning scale 21, and canned product 22.

The polymerizing vessel 2 and the cooling vessel 3 each contain double-trough screws that operate as mixers and conveyors 5 (see FIGURE II). Other equally effective mixers can be used. Polymerization vessel 2 and cooler 3 each have flush bottom discharge valves 6. The screw mixer-conveyors 5 of the polymerizing vessel 2 carry, disposed at the periphery of the screw flights, stainless steel tubing 7. This tubing is perforated with small diameter holes 8 in the order of ⅜₄" in diameter and spaced at 3½" intervals. The polymerizing vessel 2 carries a jacket 9 for heating the polymer during its condensation polymerization and the cooling vessel 3 has a jacket 10 to provide cooling for quenching the polymer after it has been treated in the polymerizing vessel 2. The mixer-conveyors 5 of the polymerizing vessel 2 are provided with hollow flights through which a heating medium is passed to transfer heat directly to the polymer during the polymerization reaction. Similarly the flights in the cooling vessel 3 are preferably hollow, and carry a cooling fluid to assist in rapid quenching of the treated polymer. Suitable means are provided for introducing an inert gas into both the polymerizing vessel 2 and the cooling vessel 3. This is preferably done in the polymerizing vessel 2 by passing the inert gas through the tubing 7 and the small holes therein directly into the polymer. Similar means may be provided, if desired, in the cooling vessel 3. The cooling vessel is equipped with a header 11 through which prescribed amounts of water can be introduced directly into the polymer in that vessel.

In accord with a preferred feature of the invention the polymerized amino acid prepolymer is charged into hold-up tank 1 after a preliminary treatment in vessel ($B_1$). In jacket heated vessel ($B_1$), the prepolymer in the solid phase, and in a granular form, is extracted with a suitable liquid solvent introduced through pipe 30 and discharged through pipe 31, to remove soluble monomeric constituents and soluble by-products formed during the melt polymerization process. The solvent may be water, methyl alcohol, ethyl alcohol, trichlorethylene, or any other suitable solvent of the extractables present in the prepolymer that is a non-solvent for the prepolymer, and the extraction can be conducted under reduced or elevated pressures but below the melting point of the prepolymer.

At equilibrium, a polymerized cyclic lactam such as epsilon caprolactam will contain from 10 to 12% extractables, autoclave produced polymers may be somewhat higher, while a similar polymer which has been subjected to polymerization under a high vacuum may have the extractables reduced to from 6 to 9%. Polyamides produced by the condensation of dibasic acids with diamines will, however, contain 1% or less extractable material.

From hold-up tank 1 the extracted prepolymer is charged through valve 1a intermittently into the polymerizing vessel 2. In this vessel the mixer-conveyors 5, which are hollow, are used in the first part of the process to impart heat to the granular polymer with thorough mixing action, the duration of the reaction in the polymerizing vessel 2 being predetermined by the time $x$ temperature required to give a polymer of predetermined viscosity and predetermined molecular weight. Throughout the polymerization, a dry inert gas such as nitrogen is passed through the polymerizing vessel by means described to remove the cyclic monomers and the products of condensation such as water, formed during the polymerization. The flow of inert gas should be sufficient to remove rapidly the volatile products of the reaction. Removal of the volatile products of condensation is essential to give the maximum rate of polymerization and polymers having optimum rigidity.

After a polymer has been converted to the prescribed inherent viscosity and molecular weight, screws 5 are converted from the mixing cycle to a conveying cycle, the hopper 6 is opened, and the polymer rapidly discharged from the polymerizing vessel 2 into the quenching vessel 3. In this vessel, during the dumping and quenching operation, the screws 5 are operating to afford rapid mixing and rapid cooling by a coolant in the hollow flights of the screws and by the coolant in the jacket 1 of the quenching vessel 3. To discharge the last trace of the treated polymer from the polymerization vessel 2, a blast of the inert gas is passed through the holes in the tubing 7 in order to insure that no treated polymer will be left in that vessel and be present during the next polymerization or heating cycle.

When the treated polymer has been reduced in its temperature to about 50° C. or below, it is then discharged from the cooler directly into the canning hopper 4. While a temperature of 50° C. or lower is preferred to facilitate packaging, polymerization is substantially stopped when the reacting mixture is cooled from polymerization temperatures to about 150° C. From the hopper 19 the product is packaged in containers that are hermetically sealed to insure that the polymer discharged from the cooler 3 will not increase in moisture content from what it had at the end of the cooling or quenching operation.

The process is adaptable for producing a synthetic linear polyamide having a moisture content of less than 0.01% by weight or, contrariwise, to produce a polymer having a prescribed amount of moisture. In the former product, the moisture content of the polymer as it leaves the polymerization vessel is substantially the moisture content of that polymer as it leaves the quenching vessel. On the contrary, if a prescribed moisture content is desired, a given amount of moisture is introduced into that vessel as steam through header 11. This operation requires extremely accurate control, for only exact quantities of moisture should be added. Control is afforded by the use of a buret 13 and boiler 14. The desired amount of water is measured into the boiler and after it has been converted to steam, forced into the cooler through header 11.

In accord with the process just described, polymers of the high viscosity and high strength type are prepared from melt polymerized (prepolymers of) epsilon caprolactam and equivalent polymerizates. As melt polymerized, these polymers are lower in molecular weight and have an inherent viscosity of less than 1.50 (number average molecular weight of less than 29,000). Such polymers are converted to polyamides of high molecular weight with a predetermined inherent viscosity of greater than 1.65 (number average molecular weight of 33,000), and preferably above 1.85 (number average molecular weight of 40,000). In this specification and the appended claims, inherent viscosity is determined by solution of the polymer in m-cresol at 25° C., (0.5 g./100 cc. of m-cresol). The conversion in polymerizing vessel 2 of the low viscosity polymer is carried out in the solid phase on granular polymer and at a temperature above about 190° C. and below about 210° C., but below the melting point of the particular polymer. The heating of the polymer in vessel 2 is accomplished by heat from the dry inert gas which may be nitrogen or carbon dioxide, and by indirect heat exchange with the fluid flowing in the hollow screw flights 5 and heat from a suitable heating fluid circulating through jacket 9. Any suitable gaseous or liquid inert heating fluid may be used.

It has been discovered that the extracted polymer can be converted to a high molecular weight, high strength polymer in a much shorter period of time than is required to polymerize the unextracted polymer, otherwise using identical polymerizing conditions. This phenomenon is shown in the following table. The epsilon caprolactam of the first three runs had been previously melt polymerized but not extracted. The granular polymer (about ⅛″ maximum particle size) of runs 4 and 5 was identical to and had been subjected to the same treatment as the polymer of the first three runs and in addition had been previously extracted with water. In run 4 a total of 20 lbs. of polymer was given 3 water washes of 25 gallons each ($T=100°$ C. and 4 hours each), and in run 5 20 parts by weight of the polymer was extracted with 2 water washes of 250 parts by weight of water per wash ($T=100°$ C. and 8 hours each).

TABLE

*Solid phase polymerization of extracted and unextracted polycaprolactam*

| Run | Condition | Time (hr.) | Temperature, ° C. | Final Inherent Viscosity |
| --- | --- | --- | --- | --- |
| 1 | U | 0 |  | 1.25 |
| 2 | U | 6 | 200 | 1.48 |
| 3 | U | 16.5 | 200 | 1.63 |
| 4 | E | 10 | 200 | 1.74 |
| 5 | E | 16.5 | 200 | 1.90 |

U=unextracted.
E=extracted.

While the process is described as a batch or intermittent process, it can also be conducted as a continuous flow process. A continuous flow process is carried out in equipment analogous to that shown in the drawings, with the exception that the polymerization vessel and the cooling vessels are longer and, if desired, the polymerization and cooling sections of the process can take place in a long tubular vessel provided with suitable mixing and conveying screws. In such a device the inlet section would be similar to polymerization vessel 1 and the cooling section would be similar to cooling vessel 2 of FIGURE I.

The polymer introduced into the charging hopper 1 should, for optimum results, be in the form of granules. It preferably should not be in finely divided form but rather a granular polymer with the smallest dimension not appreciably greater than ⅛ of an inch and no particle less than about 32-mesh U.S. standard gauge. With the smallest dimension greater than ⅛ of an inch there results a non-uniformity in polymerization throughout the particles treated, the greatest polymerization in such polymers being found at the surface, the least at positions most remote from the surface. Polymers having the described particle size are especially adapted for use as molding powders, to which pigments, colors, plasticizers, fillers and the like are added to make outstanding molding powder compositions.

Maximum inherent viscosity and maximum molecular weight increase are obtained in the shortest time at any temperature, when the by-products formed by the reaction are rapidly removed from the zone of the reaction. By the process of the invention, the vaporized by-products are removed by the flow through the reaction zone 1 of the inert gas. Optimum reaction rates of polymerization are attained by a space velocity of at least 30, i.e., the volume of the inert gas in cubic feet (S.T.P.) passing through a cubic foot of the polymer space in one hour. With a space velocity of 30 or more, the partial pressure of a by-product such as water formed during polymerization is reduced to such an extent that it has substantially no retardation on the polymerization reaction rate. As the space velocity is decreased below 30, there is a decrease in the rate of polymerization.

Solid phase polymerization may be conducted in reaction zone 1 under reduced pressure. Operation of the process in this manner is preferably carried out without an inert gas to sweep the extractables from the reaction zone.

The reaction is a time x temperature reaction in which the greater the temperature of the reaction the shorter the time and vice-versa. For example, with a polymer having an initial inhrent viscosity of about 1.50, this viscosity can be raised to about 1.85 in about 15 hours, by treatment at a temperature of 200° C. About 30 hours would be required, at a temperature of about 190° C., to produce a polymer having the same viscosity of 1.85 from an initial polymer having an inherent viscosity of about 1.50. The polyamide to be converted to high viscosity, high molecular weight polyamide is preferably a polymer having an initial inherent viscosity of less than about 1.50 and by the process of the invention, the viscosity of such polymer is increased up to 1.85 or higher.

A fabricated part formed from high viscosity molding powders of the invention, having an inherent viscosity of 1.85 or more and a moisture content of less than 0.01, retains its initial high molecular weight as it is being molded and after it has been molded. The material, moreover, during extrusion, has the ability to sustain its own weight and, furthermore, can be extruded into a bar, rod, pipe or like object and retain its high molecular weight after fabrication. While the moisture content of the fabricated part may increase at normal-use temperatures, the molecular weight of the polymer remains substantially constant irrespective of its moisture content. Contrariwise, with a high moisture content at melt temperatures, molecular weight falls off rapidly.

The hereinbefore described process is used for the treatment of preformed polymer compositions containing amide-forming groups that are prepared in accord with the processes of the U.S. Patents 2,241,321-2-3 and like processes. These preformed polymers are derived from amino-acid anhydrides (lactams), as well as cyclic lactams, epsilon caprolactam, epsilon caprylactam, and like monomeric materials that yield polyamides containing an extractable fraction greater than about 1 to 2%.

The process of the invention is also applicable to the upgrading in inherent viscosity, molecular weight, and in strength in interpolymers from lactam and amino acid, hydroxy acid, diamine-dibasic acid, glycol diester, and glycol diacid combinations.

The products of the invention are especially adapted for extrusion from the molten state through a die to give fabricated parts. In addition, the polymers have superior properties due to their high molecular weight and can be fabricated in blow-molds to produce vases, bottles, globes and related shapes. The polymers are also suitable for use in pressure-molding devices wherein a preformed shape is placed between plates that have been provided with milled cavities; the preformed shape is placed in the mold and heat and pressure applied to mold the polymer to the shape of the cavity.

I claim:
1. A process for increasing the inherent viscosity and molecular weight of a polymer from epsilon caprolactam having a number average molecular weight of less than 29,000 and an inherent viscosity of less than 1.5, said polymer containing at least 2% by weight of a material that is extractable in a solvent selected from the class consisting of water, methyl alcohol, ethyl alcohol and trichloroethylene, which comprises the steps of extracting said material from said polymer with a solvent selected from said class, until the amount of said material in said polymer is reduced to no more than 1.5% by weight, and then increasing the inherent viscosity and number average molecular weight of the polymer by solid phase polymerization in an atmosphere of an inert gas at a temperature between 190° C. and the melting point of the polymer until the inherent viscosity is increased to at least 1.75 and the number average molecular weight is increased to at least 33,000, the inherent viscosity being measured in a solution of the polymer containing 0.5 gram of polymer in 100 cc. of m-cresol at 25° C.

2. The process of claim 1 in which the extraction is conducted by washing in water at about 100° C.

3. The process of claim 1 in which the polyamide prior to extraction contains more than about 6% by weight of water extractables.

References Cited in the file of this patent
UNITED STATES PATENTS

| | | |
|---|---|---|
| 2,071,253 | Carothers | Feb. 16, 1937 |
| 2,174,527 | Peterson | Oct. 3, 1939 |
| 2,585,199 | Watson | Feb. 12, 1952 |
| 2,735,840 | Lynch | Feb. 21, 1956 |
| 2,865,895 | Pieper et al. | Dec. 23, 1958 |

FOREIGN PATENTS

| | | |
|---|---|---|
| 294,346 | Switzerland | Jan. 16, 1954 |
| 248,484 | Switzerland | Mar. 16, 1948 |
| 676,585 | Great Britain | July 30, 1952 |